Oct. 19, 1943. C. W. SHAW 2,332,271
KEY CONSTRUCTION FOR FASTENING OBJECTS TO ROTATABLE SHAFTS
Filed April 17, 1942
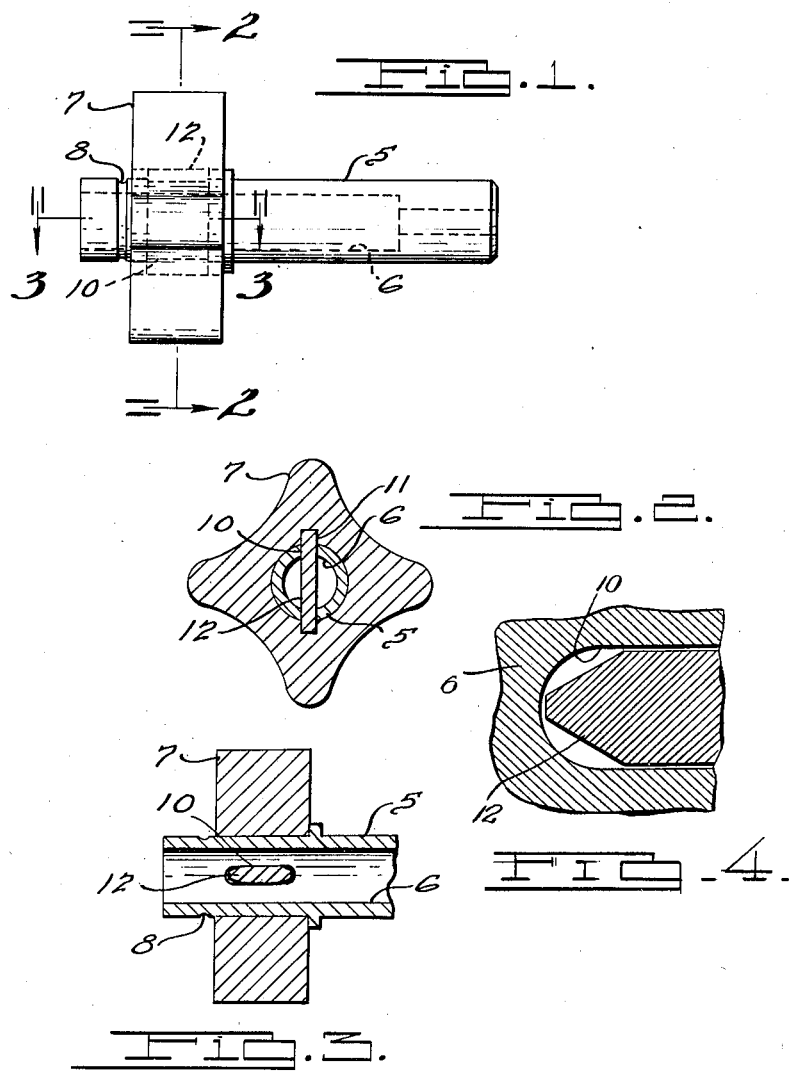
INVENTOR
Clarence W. Shaw.
BY John F. Stark
ATTORNEY

Patented Oct. 19, 1943

2,332,271

UNITED STATES PATENT OFFICE 2,332,271

KEY CONSTRUCTION FOR FASTENING OBJECTS TO ROTATABLE SHAFTS

Clarence W. Shaw, Grosse Pointe Woods, Mich., assignor to Eaton Manufacturing Company, Cleveland, Ohio, a corporation of Ohio Application April 17, 1942, Serial No. 439,322

3 Claims. (Cl. 287—52.05)

This invention relates to keys and key-slots in general, and, more particularly, concerns a novel flat key for non-rotatably fastening a part to a shaft.

Heretofore numerous keys and keyways have been devised for fastening gears, pulleys and the like, to a rotatable shaft on which they may be mounted. The most common and well known key is a Woodruff key which is simply a generally semi-circular disc of various radii and thickness dependent upon the shaft diameter upon which it is to be used. Other conventional key forms are the square, square and flat, and the plain taper key, each of which has the individual cross section enumerated and is elongated in length. Still further types of keys comprise the cylindrical key which is tapered in its longitudinal dimension and is known as the Nordberg key; and a similar form of key with a so-called gib-head. Keys are generally proportioned with relation to the shaft diameter, instead of considering the torsional load in each case, because of practical reasons, such as standardization and interchangeability.

In so far as this applicant is aware, the present novel flat type key has never been used before and was developed as a means to obtain a satisfactory key-drive to pin a part on a hollow shaft. It will be apparent the various conventional types of keys aforementioned are unsuited for use on hollow-shaft because of the thinness of the side walls of the hollow shaft. In the event the wall thickness of the hollow shaft was of sufficient dimension to accommodate a recessed key-seat, a type such as shown in applicant's co-pending application, Serial number 439,321, filed April 17, 1942, for "Key for pinning gears to shafts," would be used in preference to any conventional key form now obtainable. However, since the very thin wall thickness of hollow shafts now under consideration will not accommodate the key construction disclosed in the aforementioned co-pending application, the present invention is preferred to all other known types, because of stress concentrations, resistance to torsional shearing loads, and ease of assembly between accurately ground surfaces to provide concentric bearing surfaces therebetween and reduce run out of the parts to a minimum.

In the present instance the shaft was made hollow because of weight considerations in the use to which it was to be employed, as in aircraft parts, although obviously other analogous situations would necessitate such a shaft, for example, the transmission of a large volume of a lubricant therethrough. It will be understood that a spline drive is generally more satisfactory than a key drive because it is lighter for the same strength and provides a greater spline bearing area with small stress concentrations. However the spline drive is not susceptible of being ground accurately to provide concentric bearing surfaces between the parts.

The present rounded or tapered edge flat key, for stress concentrations and strength, closely approaches a spline drive yet accommodates concentrically ground bearing surfaces, and has other advantages and objects to be described.

Among the objects of the present invention is the provision in a hollow shaft having a part mounted thereon, of floating means to non-rotatably fasten the same thereto which comprises a flat key extended through an elongated key-slot in the shaft-wall; the provision of a shaft key-slot with smooth curves, and no sharp corners, to reduce stress concentrations and conserve shaft strength; the provision in a flat key drive, as described above of materially rounded or tapered edges on the flat key thereby affording low stress concentrations imposed by torsional shear of the driven shaft; the provision in a hollow shaft of very thin wall thickness and having a minimum weight, of a flat key drive which provides a maximum of strength and a minimum of stress concentrations; the provision of a drive, as described above, for non-rotatably securing together parts having accurately formed surfaces to provide concentric bearing surfaces therebetween, as distinguished from a spline drive. No press fit is employed therefore the parts all float and are free on the shaft without binding but are restrained against relative rotation.

Further and other objects and advantages of the present invention reside in the novel combination and arrangement of parts about to be described, when considered with the drawing forming a part of this specification, and are more particularly pointed out in the appended claims.

In the drawing similar reference characters denote corresponding parts throughout the several views, and in which:

Fig. 1 is a side-elevational view of a rotatable shaft with a toothed rotor mounted thereon and pinned for rotation therewith by the preferred form of flat key forming the subject matter of this invention; and Fig. 2 is a vertical sectional view taken of the line 2—2 of Fig. 1; and Fig. 3 is a horizontal sectional view taken on the line 3—3 of Fig. 1.

Fig. 4 is a sectional view of a detail of the fit of the edge conformation of the key in its slot at somewhat larger scale than shown in Fig. 3.

In the drawing a small diameter shaft 5 is shown as having a relatively large hollow bore and a wall thereof represented by the numeral 6, which materially reduces the weight of the rotatable parts, especially when used for an aircraft engine part or a rotated pump shaft. By way of example a toothed rotor 7 is shown mounted on the shaft and restricted from axial movement by a circular recess 8 formed around the periphery of the shaft for reception of a snap ring, not shown. Through the wall 6, of the shaft 5, an elongated slot 10 is terminated by rounded edges having small radii to reduce stress concentrations, as best shown in Fig. 3. In Fig. 2 will be seen the manner in which a flat generally rectangular flat key 12 may first be inserted through the slotted opening 10 in hollow shaft 5. The member 7, or other part to be secured, having a key-slot 11 formed in diametrically opposite portions of the wall surrounding its inner aperture and extended from face to face provides a key-seat, which may then be slipped over the key 12. Thereafter a snap ring, not shown, is sprung into the recess 8 and the rotor or other part is prevented from removal along the shaft and is securely keyed for rotation in unison therewith.

With a flat key 12 as described having a small taper at the four corners which position the key in spaced relation to the rounded edges in the slotted opening 10 formed in opposite walls of the hollow shaft 5 it will be apparent that jamming or wedging caused by transverse concentrations of stress induced by torsional loads on the shaft are reduced to a minimum, and, conversely, due to the large bearing area afforded by the novel flat key which bridges and is supported at diametrical opposite sides of the hollow shaft maximum strength and resistance to torsional shear is provided. Furthermore, the particular shaft key-slot having small radii at the opposite edges thereof, as produced by the machining operation thereon, leave no sharp corners for concentrations of stress and without thereby materially reducing the strength of the small diameter thin wall shaft, as best shown in Fig. 4.

From the foregoing disclosures it will be seen that a novel flat key has been described embodying, among other things the objects and advantages of the invention first enumerated; however, it is not intended to be limited to the specific example shown which is by way of illustration only, and the spirit and substance of the broad invention is commensurate with the scope of the following claims.

What I claim is:

1. Key driving means for non-rotatably securing to a rotatable hollow shaft a part mounted thereon, said shaft having an elongated slotted opening formed diametrically through the walls of said hollow shaft normally to the longitudinal axis thereof, said part to be mounted on said shaft having a central aperture with a slotted opening in diametrically opposite walls thereof extended through the width of said part, said means for non-rotatably fastening said part to said shaft comprising a flat key having cross section dimensions which make a slidable fit in the slotted opening in the shaft and project a short distance beyond the outer periphery of the shaft whereby the slotted opening in said part may be slipped over the projected portion of said key to non-rotatably lock the part for rotation with the shaft, and the opposite edges of said key being tapered so that contact with arcuate end portions of the enveloping slotted opening is effected at a medial portion thereof.

2. In a drive for non-rotatably mounting a driven part on a driving part, a keyway in said driven part, a keyway in said driving part having arcuate end portions and the said keyways defining a key-seat therebetween, a key having the opposite edges thereof tapered disposed in said key-seat, and said tapered edges of the key arranged to contact the arcuate end portions of the driving part keyway at a medial portion thereof whereby jamming or wedging and incipient points of stress concentration therebetween are prevented.

3. In a drive for non-rotatably mounting a driven part on a driving part, a keyway in said driven part, a keyway in said driving part having arcuate end portions and the said keyways defining a key-seat therebetween, a key having the opposite edges thereof tapered disposed in said key-seat, and the length of the tapered edges of said key being equal to or greater than the radius of the arcuate end portions of the driving part keyway whereby jamming or wedging and incipient points of stress concentration therebetween are prevented.

CLARENCE W. SHAW.